US011325927B2

(12) United States Patent
Mariott et al.

(10) Patent No.: US 11,325,927 B2
(45) Date of Patent: May 10, 2022

(54) ACTIVATED SPRAY-DRIED ZIEGLER-NATTA CATALYST SYSTEM (71) Applicant: Univation Technologies, LLC, Houston, TX (US)

(72) Inventors: Wesley R. Mariott, Manvel, TX (US); C. Dale Lester, South Charleston, WV (US); Nitin Borse, Pearland, TX (US)

(73) Assignee: UNIVATION TECHNOLOGIES, LLC, Houston, TX (US)

(*) Notice: Subject to any disclaimer, the term of this patent is extended or adjusted under 35 U.S.C. 154(b) by 5 days.

(21) Appl. No.: 16/769,267

(22) PCT Filed: Dec. 3, 2018

(86) PCT No.: PCT/US2018/063553
§ 371 (c)(1),
(2) Date: Jun. 3, 2020

(87) PCT Pub. No.: WO2019/112927
PCT Pub. Date: Jun. 13, 2019

(65) Prior Publication Data
US 2020/0369692 A1 Nov. 26, 2020

Related U.S. Application Data (60) Provisional application No. 62/594,698, filed on Dec. 5, 2017.

(51) Int. Cl.
C08F 4/654 (2006.01)
C08F 4/655 (2006.01)
C07F 7/28 (2006.01)
C08F 210/16 (2006.01)

(52) U.S. Cl.
CPC ............ C07F 7/28 (2013.01); C08F 210/16 (2013.01); C08F 4/6543 (2013.01); C08F 4/6555 (2013.01)

(58) Field of Classification Search
CPC ...... C08F 4/6555; C08F 4/6557; C08F 4/655; C08F 4/6543
See application file for complete search history.

(56) References Cited

U.S. PATENT DOCUMENTS

| | | |
|---|---|---|
| 3,324,095 A | 6/1967 | Carrick |
| 3,709,853 A | 1/1973 | Karapinka |
| 4,003,712 A | 1/1977 | Miller |
| 4,011,382 A | 3/1977 | Levine et al. |
| 4,302,566 A | 11/1981 | Karol et al. |
| 4,399,054 A | 8/1983 | Ferraris et al. |
| 4,543,399 A | 9/1985 | Jenkins, III et al. |
| 4,588,790 A | 5/1986 | Jenkins, III et al. |
| 4,882,400 A | 11/1989 | Dumain et al. |
| 4,988,783 A | 1/1991 | Beran et al. |
| 4,994,534 A | 2/1991 | Rhee et al. |
| 5,008,204 A | 4/1991 | Stehling |
| 5,290,745 A * | 3/1994 | Jorgensen ............... C08F 10/00 502/109 |
| 5,352,749 A | 10/1994 | DeChellis et al. |
| 5,462,999 A | 10/1995 | Griffin et al. |
| 5,541,270 A | 7/1996 | Chinh et al. |
| 5,627,242 A | 5/1997 | Jacobsen et al. |
| 5,665,818 A | 9/1997 | Tilston et al. |
| 5,677,375 A | 10/1997 | Rifi et al. |
| 5,728,335 A * | 3/1998 | Neubauer ................. B29B 9/06 264/141 |
| 6,187,866 B1 * | 2/2001 | Jorgensen ............. C08F 210/16 525/197 |
| 6,489,408 B2 | 12/2002 | Mawson et al. |
| 6,617,405 B1 * | 9/2003 | Jorgensen ............... C08F 10/02 502/104 |
| 6,982,237 B2 * | 1/2006 | Wagner ................... C08F 10/00 502/125 |
| 7,348,383 B2 * | 3/2008 | Zoeckler ................. C08F 10/00 502/103 |
| 7,504,464 B2 * | 3/2009 | Whited ................. C08F 210/16 526/124.2 |
| 2004/0009869 A1 | 1/2004 | Wagner et al. |
| 2004/0010101 A1 | 1/2004 | Wagner et al. |
| 2004/0138054 A1 | 7/2004 | Wagner et al. |
| 2006/0173123 A1 | 8/2006 | Yang et al. |
| 2013/0137827 A1 * | 5/2013 | Jorgensen ................ C08F 2/34 525/240 |

(Continued)

FOREIGN PATENT DOCUMENTS

| | | |
|---|---|---|
| BE | 839380 | 9/1976 |
| EP | 0794200 | 9/1997 |
| EP | 0634421 | 10/1997 |
| EP | 0802202 | 10/1997 |
| EP | 1572756 | 7/2004 |
| EP | 1891125 | 2/2008 |
| WO | 1993003093 | 2/1993 |
| WO | 2004055065 | 7/2004 |
| WO | 2006138036 | 12/2006 |

(Continued)

OTHER PUBLICATIONS

Senso, The Influence of Mixed Activators on Ethylene Polymerization and Ethylene/1-Hexene Copolymerization with Silica-Supported Ziegler-Natta Catalyst, Molecules, 2010, pp. 9323-9339, vol. 15.

Wild, Determination of Branching Distributions in Polyethylene and Ethylene Copolymers, Journal of Polymer Science: Polymer Physics Edition, 1982, pp. 441-455, vol. 20.

Primary Examiner — Rip A Lee (57) ABSTRACT

An activated, titanium-based, spray-dried Ziegler-Natta catalyst system containing a titanium-based Ziegler-Natta catalyst, a carrier material, and an activator mixture comprising an effective amount of an activator mixture comprising triethylaluminum and diethylaluminum chloride for producing a substantially uniform comonomer composition distribution. Also, polyolefins; methods of making and using same; and articles containing same.

5 Claims, 1 Drawing Sheet (56) References Cited

U.S. PATENT DOCUMENTS

2016/0347892 A1  12/2016  Conti et al.

FOREIGN PATENT DOCUMENTS

| WO | 2009124722 | 10/2009 |
| WO | 2010125018 | 11/2010 |
| WO | 2016207270 | 12/2016 |
| WO | 2017151592 | 9/2017 |

* cited by examiner

ACTIVATED SPRAY-DRIED ZIEGLER-NATTA CATALYST SYSTEM

FIELD

Titanium-based Ziegler-Natta catalyst, polyolefins, methods of making and using same, and articles containing same.

INTRODUCTION

Ziegler-Natta (pro)catalysts may be based on titanium or vanadium. A typical Ziegler-Natta procatalyst comprises a complex of $TiCl_3$ and $MgCl_2$. The $MgCl_2$ is a divided solid that has high surface area and also functions as a support material.

A typical Ziegler-Natta procatalyst system comprises the Ziegler-Natta procatalyst and at least one additional component other than a reducing agent or activator. Examples of the at least one additional component are an organic modifier and a carrier material.

A typical Ziegler-Natta catalyst system comprises a Ziegler-Natta catalyst comprising a reaction product of, sequentially, a chemical reduction and a chemical activation of the Ziegler-Natta procatalyst system. Thus, the Ziegler-Natta catalyst system is made by contacting the Ziegler-Natta procatalyst system with a reducing agent effective for chemically reducing the Ziegler-Natta procatalyst system so as to make a chemical reduction product, and then contacting the chemical reduction product with an activator to increase catalytic activity thereof and make the Ziegler-Natta catalyst system. Ziegler-Natta catalysts are mentioned in *The Influence of Mixed Activators on Ethylene Polymerization and Ethylene/1-Hexene Copolymerization with Silica-Supported Ziegler-Natta Catalyst*, by Nichapat Senso, et al.; Molecules, 2010, 15, 9323-9339; and WO 2006/138036 A1 and its family member EP1891125; WO 2010/125018 A1; and WO 2017/151592 A1.

In Ziegler-Natta catalyst systems the Ziegler-Natta catalyst may enhance rates of polymerization of olefin monomer(s). The organic modifier may attenuate the catalytic activity or selectivity of the Ziegler-Natta catalyst, such as a function of reaction temperature, or may alter the composition or reactivity of the activator. The carrier material typically defines size and shape of, and controls access of monomer to, the Ziegler-Natta catalyst. The function of the carrier material may vary from catalyst system to catalyst system depending on how the catalyst system is constructed, which in turn largely depends upon how the catalyst system is made and the composition and features of the carrier material.

The carrier material is a divided solid and is different in composition from those of the titanium halide and support material. The carrier material may be an alumina, a clay, or a silica. The carrier material may be porous, such as mesoporous, and thus may define exterior surfaces (outside of pores) and interior surfaces (inside pores). Ziegler-Natta catalyst systems that comprise the Ziegler-Natta catalyst and the carrier material may be classified according to features such as the size, shape and location of the Ziegler-Natta catalyst therein. In turn these features may be controlled according to the composition of the carrier material and the method of preparation of the Ziegler-Natta catalyst system.

In supported Ziegler-Natta catalyst systems the carrier material may be mesoporous spheres of amorphous untreated silica, wherein the interior and exterior surfaces are hydrophilic. The supported Ziegler-Natta catalyst systems generally may be made by a concentrating method comprising suspending a porous silica in a tetrahydrofuran solution of the titanium chloride and magnesium chloride to form a mixture, and then concentrating the mixture under vacuum to give a supported Ziegler-Natta procatalyst system, which may be subsequently reduced and activated. It is believed that the concentrating method results in the Ziegler-Natta procatalyst being precipitated inside the pores of the porous silica, and after the chemically reducing and activating steps the pores contain most or all of the Ziegler-Natta catalyst. Thus without wishing to be bound by theory, it is believed that the pores of the porous silica largely define the size and shape of, and control monomer access to the Ziegler-Natta catalyst in supported Ziegler-Natta catalyst systems. During polymerizations, ethylene and/or alpha-olefin may enter the pores of the porous silica in order to contact the Ziegler-Natta catalyst therein, and growth of polymer therein may be restricted by the mesopore diameters and pore volume. Commercial supported Ziegler-Natta catalyst systems include UCAT™ A from Univation Technologies, LLC.

In spray-dried Ziegler-Natta catalyst systems, the carrier material may be a hydrophobic pre-treated fumed silica, wherein the interior and exterior surfaces are hydrophobic. The spray-dried Ziegler-Natta catalyst systems may be made by a spray-drying method comprising suspending a hydrophobic pre-treated silica (pre-treated with a hydrophobing agent) in a tetrahydrofuran solution of the Ziegler-Natta procatalyst to form a mixture, and spray-drying the mixture to give a spray-dried Ziegler-Natta procatalyst system, which may be subsequently reduced and activated. It is believed that the spray-drying method results in the hydrophobic pores containing relatively little or none of the Ziegler-Natta catalyst, which instead largely resides on the exterior surfaces. Thus without wishing to be bound by theory, it is believed that the exterior surfaces largely define the size and shape of, and control monomer access to, the Ziegler-Natta catalyst in spray-dried Ziegler-Natta catalyst systems. During polymerizations, ethylene and/or alpha-olefin may contact the Ziegler-Natta catalyst on the exterior surface of the silica, a polymer produced thereon may grow largely unrestricted by pore dimensions. Commercial spray-dried Ziegler-Natta catalyst systems include UCAT™ J from Univation Technologies, LLC.

Thus, knowledge about supported Ziegler-Natta (pro)catalyst systems is not necessarily predictive of, or applicable to, spray-dried Ziegler-Natta (pro)catalyst systems, and vice versa.

SUMMARY

We provide an activated, titanium-based, spray-dried Ziegler-Natta catalyst system comprising a titanium-based Ziegler-Natta catalyst, a carrier material, and an effective amount of an activator mixture comprising triethylaluminum (TEAl) and diethylaluminum chloride (DEAC); or an activation reaction product thereof. The inventive catalyst system may be used to enhance the polymerization reaction rate of a chemical process for manufacturing a polyolefin composition. In such a process the effective amount may be a quantity of the activator mixture sufficient for obtaining a substantially uniform (substantially flat (gently sloping) plot of) comonomer composition distribution of ethylene/alpha-olefin copolymer compositions made therewith. When the activator mixture is used in such an effective amount, it unpredictably enables the inventive catalyst system to copolymerize ethylene and alpha-olefin comonomer so as to produce an ethylene/alpha-olefin copolymer composition having a substantially uniform comonomer composition distribution than that of a comparative ethylene/alpha-olefin copolymer produced with a comparative catalyst system that is the same as the inventive catalyst system except wherein the activator of the comparative catalyst system consists of triethylaluminum (TEAl) and is free of diethylaluminum chloride (DEAC). The substantially uniform comonomer composition distribution of the inventive ethylene/alpha-olefin copolymer composition is in the regime we recognized would be beneficial for making films having improved mechanical properties. Alternatively or additionally, the effective amount may be a quantity of the activator mixture sufficient for making an inventive ethylene/alpha-olefin copolymer composition having a higher fluidized bulk density (FBD) and/or higher settled bulk density (SBD) and/or higher dart impact (film form) relative to that/those of the comparative ethylene/alpha-olefin copolymer composition, made with the comparative catalyst system. In some embodiments the inventive FBD and/or inventive SBD of the inventive ethylene/alpha-olefin copolymer composition and/or inventive dart impact of a film of the inventive ethylene/alpha-olefin copolymer composition independently is/are higher by at least 5%, alternatively at least 10%; and, in some embodiments, at most 20%, than the FBD and/or SBD, respectively, of the comparative ethylene/alpha-olefin copolymer composition and/or the dart impact of a film of the comparative ethylene/alpha-olefin copolymer composition, respectively. We also provide a method of making the inventive catalyst system, a method of polymerizing olefin (co)monomer(s), polyolefins made by the method, and manufactured articles containing or made from the polyolefins. The polymerization may be conducted in a gas phase or a liquid-phase.

DETAILED DESCRIPTION

The Introduction, Summary and Abstract are incorporated here by reference.

Certain inventive embodiments are described below as numbered aspects for easy cross-referencing. Additional embodiments are described elsewhere herein.

Aspect 1. An activated spray-dried Ziegler-Natta catalyst system comprising (A*) an activated Ziegler-Natta catalyst comprising an activated complex of $TiCl_3$ and $MgCl_2$, (B) a hydrophobic pre-treated fumed silica (substantially nonporous, alternatively completely nonporous), and an effective amount of (C) an activator mixture of triethylaluminum (TEAl) and diethylaluminum chloride (DEAC) at a TEAl/DEAC weight/weight ratio of from 20:80 to 80:20; or a activation reaction product thereof. The effective amount is a quantity sufficient for obtaining the substantially uniform comonomer composition distribution of ethylene/alpha-olefin copolymer compositions made therewith and for making a polyethylene composition, such as an ethylene/alpha-olefin copolymer composition, having a higher fluidized bulk density and/or higher settled bulk density relative to that/those of a comparative polyethylene composition, such as a comparative ethylene/alpha-olefin copolymer composition, produced with a comparative activated spray-dried Ziegler-Natta catalyst system activated with TEAl alone or DEAC alone and made to the same melt index value (I2) as measured by the Melt Index Test Method and same density value as measured by the Density Test Method, described later. The substantially uniform (narrower) comonomer composition distribution (CCD) of the inventive ethylene/alpha-olefin copolymer composition may be a significant reason for the composition's better physical properties.

Aspect 2. The activated spray-dried Ziegler-Natta catalyst system of aspect 1 wherein the effective amount of (C) activator mixture is a TEAl/DEAC weight/weight ratio of from 25:75 to 75:25, alternatively from 30.0:70.0 to 70.0:30.0, alternatively from 35:65 to 65:35, alternatively from 40.0:60.0 to 60.0:40.0, alternatively from 45:55 to 55:45, alternatively from 47:53 to 53:47, alternatively 50:50.

Aspect 3. A method of making an activated spray-dried Ziegler-Natta catalyst system, the method comprising contacting a chemically-reduced spray-dried Ziegler-Natta catalyst system comprising ($A^{red}$) a chemically-reduced Ziegler-Natta catalyst comprising a complex of $TiCl_3$ and $MgCl_2$ and (B) a hydrophobic pre-treated fumed silica, with the effective amount of (C) the activator mixture, thereby making the activated spray-dried Ziegler-Natta catalyst system. The activator may comprise one or more alkylaluminum compounds such as a combination of diethylaluminum chloride and triethylaluminum. The activation reaction may be run under an inert gas atmosphere and in a saturated and/or aromatic hydrocarbon solvent, such as an alkane; a mixture of two or more alkanes; a mineral oil; an alkyl-substituted benzene such as toluene, ethylbenzene, or xylenes; or a mixture of any two or more thereof. The activating reaction may use the reaction mixture made in the reduction reaction of the previous aspect and may be run in the same reactor as the reduction reaction. The resulting activated spray-dried Ziegler-Natta catalyst system may then be fed into a polymerization reactor, such as the polymerization reactor used in the below method of making a polyethylene composition. Alternatively, the activating reaction may be run in the polymerization reactor, which may accomplished by introducing via a first feedline into the polymerization reactor a first feed of the chemically-reduced spray-dried Ziegler-Natta catalyst system and, separately, introducing via a second feedline into the polymerization reactor a second feed of the activator, thereby making the activated spray-dried Ziegler-Natta catalyst system in situ in the polymerization reactor, wherein the first and second feed lines are different and introduce their respective feeds at different feed points in the polymerization reactor. Alternatively, the activating reaction may be accomplished by introducing into a co-feedline, which downstream is entering the polymerization reactor, the first feed of the chemically-reduced spray-dried Ziegler-Natta catalyst system and the second feed of the activator, which may start the making of the activated spray-dried Ziegler-Natta catalyst system in situ in the co-feedline, and then co-feeding the resulting mixture of the chemically-reduced spray-dried Ziegler-Natta catalyst system and the activator, and any such activated catalyst system made in the co-feedline, from the co-feedline into the polymerization reactor, thereby making the activated spray-dried Ziegler-Natta catalyst system in the polymerization reactor. The activated spray-dried Ziegler-Natta catalyst system may be dried by removing the saturated and/or aromatic hydrocarbon solvent therefrom. Without wishing to be bound by theory, we believe that the exterior surfaces of the hydrophobic pre-treated fumed silica largely define the construction of the (A*) activated Ziegler-Natta catalyst in the activated spray-dried Ziegler-Natta catalyst system. The activated spray-dried Ziegler-Natta catalyst system of aspect 1 or 2 may be a product of the method of aspect 3. The term "spray-dried" is used in aspects 1 to 3 in the conventional, art recognized sense that construction of the (A*) activated Ziegler-Natta catalyst in the activated spray-dried Ziegler-Natta catalyst system is derived from the effects of a prior step of spray-drying, described later. The (A*) activated Ziegler-Natta catalyst has at least 10 fold higher catalytic activity and/or polymer productivity per unit catalyst weight than does the ($A^{red}$) chemically-reduced Ziegler-Natta catalyst Aspect 4. A method of making a polyethylene composition, the method comprising contacting ethylene (monomer) and optionally zero, one, or more ($C_3$-$C_{20}$)alpha-olefin (comonomer(s)) with the activated spray-dried Ziegler-Natta catalyst system of aspect 1 or 2 to give a polyethylene composition comprising a polyethylene homopolymer or ethylene/($C_3$-$C_{20}$)alpha-olefin copolymer composition, respectively, and the activated spray-dried Ziegler-Natta catalyst system, or a by-product thereof. The polyethylene homopolymer contains constituent units that are derived from ethylene. The ethylene/($C_3$-$C_{20}$)alpha-olefin copolymer contains monomeric constituent units that are derived from ethylene and comonomeric constituent units that are derived from one or more ($C_3$-$C_{20}$)alpha-olefin comonomer(s), respectively. The ($C_3$-$C_{20}$)alpha-olefin-derived comonomeric constituent units may be derived from 1-butene; alternatively 1-hexene; alternatively 1-octene; alternatively a combination of any two thereof.

Aspect 5. The method of aspect 4 comprising a gas phase polymerization in the presence of molecular hydrogen gas ($H_2$) and, optionally, an induced condensing agent (ICA) in one, two or more gas phase polymerization reactors under (co)polymerizing conditions, thereby making the polyethylene composition; wherein the (co)polymerizing conditions comprise a reaction temperature from 80 degrees (°) to 110° Celsius (C.); a molar ratio of the molecular hydrogen gas to the ethylene ($H_2$/$C_2$ molar ratio) from 0.001 to 0.050; and a molar ratio of the comonomer to the ethylene (Comonomer/$C_2$ molar ratio) from 0.005 to 0.10.

Aspect 6. The method of aspect 4 or 5 comprising copolymerizing ethylene and one or more ($C_3$-$C_{20}$)alpha-olefin (comonomer(s)) to give the ethylene/($C_3$-$C_{20}$)alpha-olefin copolymer composition.

Aspect 7. A polyethylene composition made by the method of aspect 4, 5 or 6.

Aspect 8. A manufactured article comprising a shaped form of the polyethylene composition of aspect 7. The manufactured article may be selected from: coatings, films, sheets, extruded articles, and injection molded articles. The manufactured article may be a coating layer (e.g., of a coated article), pipe, film (e.g., blown film), agricultural film, food packaging, garment bags, grocery bags, heavy-duty sacks, industrial sheeting, pallet and shrink wraps, bags, buckets, freezer containers, lids, and toys.

Aspect 9. The method of aspect 3 further comprising a preliminary step making the chemically-reduced spray-dried Ziegler-Natta catalyst system, the method comprising contacting a spray-dried Ziegler-Natta procatalyst system with a reducing agent effective for chemically reducing a complex of $TiCl_3$ and $MgCl_2$, thereby giving the chemically-reduced spray-dried Ziegler-Natta catalyst system; wherein the spray-dried Ziegler-Natta procatalyst system comprises a product of spray-drying a slurry of ($A^+$) a Ziegler-Natta procatalyst system consisting essentially of a complex of $TiCl_3$ and $MgCl_2$ and (B) a hydrophobic pre-treated fumed silica, and optionally tetrahydrofuran. In some aspects the titanium complex is made from $TiCl_4$ and Mg metal ($Mg^0$). In some aspects the titanium complex is made from $TiCl_4$ and Mg metal and the slurry of constituents ($A^+$) and (B) is made by a first process comprising heating at a first temperature and for a first period of time $TiCl_4$ and Mg metal in anhydrous tetrahydrofuran to give a first solution of the complex of $TiCl_3$ and $MgCl_2$ in the anhydrous tetrahydrofuran, adding finely-divided solid $MgCl_2$ to the first solution to give suspension of $MgCl_2$ in the solution of the complex of $TiCl_3$ and anhydrous tetrahydrofuran, heating at a second temperature and for a second period of time the suspension until the finely-divided solid $MgCl_2$ dissolves to give a second solution of the complex of $TiCl_3$ and $MgCl_2$ and added $MgCl_2$ in the anhydrous tetrahydrofuran, and adding the (B) hydrophobic pre-treated fumed silica to the second solution at a third temperature to give the slurry of constituents ($A^+$) and (B). In other aspects the titanium complex is made from $TiCl_3$.AA and $MgCl_2$. The "$TiCl_3$.AA" means a mixture of a 3:1 molar ratio of $TiCl_3$/$AlCl_3$, which may be obtained from a commercial supplier or may be made by a reaction of 3 mole equivalents of $TiCl_4$ with one mole equivalent of aluminum (Al) metal ($Al^0$), which acts as a reducing agent. In other aspects the titanium complex is made from $TiCl_3$.AA and $MgCl_2$ and the slurry of constituents ($A^+$) and (B) is made by a second process comprising heating at a first temperature and for a second period of time finely-divided solid $MgCl_2$ in anhydrous tetrahydrofuran modifier to give a third solution of the $MgCl_2$ in the anhydrous tetrahydrofuran, adding $TiCl_3$.AA to the third solution at a third temperature and mixing for a first period of time to give a fourth solution of a complex of $TiCl_3$.AA and $MgCl_2$ and additional $MgCl_2$ in the anhydrous tetrahydrofuran, and adding the (B) hydrophobic pre-treated fumed silica to the fourth solution at a third temperature to give the slurry of constituents ($A^+$) and (B). The slurry made by the first or second process may be mixed for a third period of time before being spray-dried to give the modified spray-dried Ziegler-Natta procatalyst system. Suitable spray-drying conditions are described later in the Examples. The first and second temperatures independently may be from 30 degrees Celsius (° C.) to the boiling point of constituent (C), alternatively from 50° to 65° C., alternatively from 58° to 62° C., alternatively 60° C. The first period of time may be from 10 to 120 minutes, alternatively from 45 to 90 minutes, alternatively from 50 to 70 minutes, alternatively 60 minutes. The second period of time may be from 1 to 48 hours, alternatively from 3 to 30 hours, alternatively from 4 to 12 hours, alternatively 5 hours. The third temperature may be from 30° to 55° C., alternatively from 35° to 50° C., alternatively from 35° to 45° C., alternatively from 40° to 45° C. The third period of time may be from 5 to 60 minutes, alternatively from 10 to 45 minutes, alternatively from 20 to 40 minutes, alternatively 30 minutes. In the first process, measured amounts of the $TiCl_4$ and Mg metal may be added to a measured amount of the anhydrous tetrahydrofuran in a vessel. For enhanced performance of the ultimately made (A*) activated Ziegler-Natta catalyst comprising a complex of $TiCl_3$ and $MgCl_2$ (see below), in the first process the addition of $TiCl_4$ and Mg metal and the subsequent heating at the first temperature to form the first solution are performed before the finely-divided solid $MgCl_2$ is added to the anhydrous tetrahydrofuran. If, in a variant of the first process, the finely-divided solid $MgCl_2$ is added to the anhydrous tetrahydrofuran modifier before the $TiCl_4$ and Mg metal are added to the anhydrous tetrahydrofuran, the performance of the ultimately made (A*) activated Ziegler-Natta catalyst comprising a complex of $TiCl_3$ and $MgCl_2$ (see below) may not be enhanced. Carrier material of the activated spray-dried Ziegler-Natta catalyst system consists essentially of, alternatively consists of, the (B) hydrophobic pre-treated fumed silica, which means it contains from 0 to 5 weight percent (wt %), alternatively 0 to 0.9 wt %, alternatively 0 to 0.09 wt %, alternatively 0 wt % porous silica. Without wishing to be bound by theory, we believe that the exterior surfaces of the hydrophobic pre-treated fumed silica largely define the construction of the (A) Ziegler-Natta procatalyst in the spray-dried Ziegler-Natta procatalyst system. The reducing agent may comprise trihexylaluminum, diethylaluminum chloride, or, typically, a combination of trihexylaluminum and diethylaluminum chloride. The reduction reaction may be run under an inert gas atmosphere and in a saturated and/or aromatic hydrocarbon solvent, such as an alkane; a mixture of two or more alkanes; a mineral oil; an alkyl-substituted benzene such as toluene, ethylbenzene, or xylenes; or a mixture of any two or more thereof. The saturated and/or aromatic hydrocarbon solvent used in the activating reaction may be the same as or different than the saturated and/or aromatic hydrocarbon solvent used in the reducing reaction. The chemically-reduced spray-dried Ziegler-Natta catalyst system may be dried by removing the saturated and/or aromatic hydrocarbon solvent therefrom. Without wishing to be bound by theory, we believe that the exterior surfaces of the hydrophobic pre-treated fumed silica largely define the construction of the ($A^{red}$) chemically-reduced Ziegler-Natta catalyst in the activated spray-dried Ziegler-Natta catalyst system. The term "spray-dried" is used in these aspects in the conventional, art recognized sense that construction of the activated spray-dried Ziegler-Natta catalyst system is derived from the effects of a prior step of spray-drying.

Aspect 10. The method of aspect 9 further comprising a preliminary step of making the spray-dried Ziegler-Natta procatalyst system, the method comprising spray-drying a mixture of the (B) hydrophobic pre-treated fumed silica and a solution of the (At) Ziegler-Natta procatalyst and optionally tetrahydrofuran to give the spray-dried Ziegler-Natta procatalyst system. The spray-dried Ziegler-Natta procatalyst system of aspect 8 or 9 has not yet been contacted with a reducing agent effective for chemically reducing a complex of $TiCl_3$ and $MgCl_2$. Carrier material of the spray-dried Ziegler-Natta procatalyst system consists essentially of, alternatively consists of, the (B) hydrophobic pre-treated fumed silica, which means it contains from 0 to 5 weight percent (wt %), alternatively 0 to 0.9 wt %, alternatively 0 to 0.09 wt %, alternatively 0 wt % porous silica. Without wishing to be bound by theory, we believe that the exterior surfaces of the hydrophobic pre-treated fumed silica largely define the construction of the (A) Ziegler-Natta procatalyst in the spray-dried Ziegler-Natta procatalyst system.

Aspect 11. The method of aspect 9 or 10 further described by any one or limitations (i) to (vi): (i) the titanium chloride is $TiCl_3$; (ii) the titanium chloride is $TiCl_4$; (iii) the titanium chloride is a combination of $TiCl_3$ and $TiCl_4$; (iv) the (B) hydrophobic pre-treated fumed silica is a product of pre-treating an untreated fumed silica with a silicon-based hydrophobing agent; (v) the hydrophobic pre-treated fumed silica is a product of pre-treating an untreated fumed silica with a silicon-based hydrophobing agent selected from trimethylsilyl chloride, dimethyldichlorosilane, a polydimethylsiloxane fluid, hexamethyldisilazane, an octyltrialkoxysilane (e.g., octyltrimethoxysilane), and a combination of any two or more thereof; (vi) both (ii) and (v). Examples of the hydrophobic treated fumed silica are CAB-O-SIL hydrophobic fumed silicas available from Cabot Corporation, Alpharetta Ga., USA.

The spray-dried Ziegler-Natta procatalyst system; chemically-reduced, spray-dried Ziegler-Natta procatalyst system; and spray-dried Ziegler-Natta catalyst system may be collectively referred to as spray-dried Ziegler-Natta (pro)catalyst systems. The spray-dried Ziegler-Natta procatalyst system; chemically-reduced, spray-dried Ziegler-Natta procatalyst system; and spray-dried Ziegler-Natta catalyst system independently may be characterized by any one of limitations (i) to (x): (i) a Mg atom loading of from 2.0 to 10.0 weight percent (wt %), alternatively from 6.0 to 8.5 wt %, alternatively from 6.5 to 8.0 wt %, based on total weight of the ad rem system; (ii) a Mg atom concentration of from 0.82 to 4.11 millimoles Mg atom per gram of the ad rem system (mmol/g), alternatively from 2.0 to 4.0 mmol/g, alternatively 2.47 to 3.50 mmol/g, alternatively from 2.67 to 3.29 mmol/g; (iii) a Ti atom loading of from 0.5 to 5.0 wt %, alternatively from 1.0 to 4.0 wt %, alternatively from 1.5 to 3.5 wt %, based on total weight of the ad rem system; (iv) a Ti atom concentration of from 0.10 to 1.04 millimoles Ti atom per gram of the ad rem system (mmol/g), alternatively from 0.21 to 0.84 mmol/g, alternatively from 0.25 to 0.80 mmol/g, alternatively from 0.31 to 0.73 mmol/g; (v) a Mg atom-to-Ti atom molar ratio from 0.79 to 39.4, alternatively from 2.95 to 16.7, alternatively from 3.0 to 15, alternatively from 3.66 to 10.5; (vi) a loading of the tetrahydrofuran/ethanol modifier of from 15 to 45 wt %, alternatively from 18 to 39 wt %, alternatively from 20.0 to 35.0 wt %; (vii) both (i) and (ii); (viii) both (i) and (iii); (ix) both (i) and (iv); (x) both (i) and (v); (xi) both (i) and (vi); (xii) both (ii) and (iii); (xiii) both (ii) and (iv); (xiv) both (ii) and (v); (xv) both (ii) and (vi); (xvi) both (iii) and (iv); (xvii) both (iii) and (v); (xviii) both (iii) and (vi); (xix) both (iv) and (v); (xx) both (iv) and (vi); (xxi) both (v) and (vi); (xxii) both (vii) and any one of (viii) to (xxi); (xxiii) both (viii) and any one of (ix) to (xxi); (xxiv) both (ix) and any one of (x) to (xxi); (xxv) both (x) and any one of (xi) to (xxi); (xxvi) both (xi) and any one of (xii) to (xxi); (xxvii) both (xii) and any one of (xiii) to (xxi); (xxviii) both (xiii) and any one of (xiv) to (xxi); (xxix) both (xiv) and any one of (xv) to (xxi); (xxx) both (xv) and any one of (xvi) to (xxi); (xxxi) both (xvi) and any one of (xvii) to (xxi); (xxiii) both (xvii) and any one of (xviii) to (xxi); (xxxiii) both (xviii) and any one of (xix) to (xxi); (xxxiv) both (xix) and any one of (xx) and (xxi); (xxiv) both (xx) and (xxi).

The inventive catalyst system has an improved composition and, optionally, an improved construction. Without wishing to be bound by theory, it is believed that the improved composition and, optionally, improved construction may be a reason for the inventive ethylene/alpha-olefin copolymer composition having a substantially uniform (flattened plot of) comonomer composition distribution. It is believed that the inventive ethylene/alpha-olefin copolymer composition may have at least one additional improved property. In some embodiments the inventive activated spray-dried Ziegler-Natta catalyst system (e.g., the inventive activated spray-dried Ziegler-Natta catalyst system of Inventive Example 1 described later) and the inventive ethylene/alpha-olefin copolymer composition (e.g., an inventive ethylene/1-butene copolymer composition of Inventive Example (A) described later) made therewith according to the inventive polymerization method is characterized by at least one of the following normalized property values relative to a corresponding comparative ethylene/alpha-olefin copolymer composition (e.g., a comparative ethylene/1- butene copolymer of Comparative Example (A) described later), which is made with a comparative commercial UCAT™ J activated spray-dried Ziegler-Natta catalyst system of Comparative Example 1 described later according to a same polymerization method: (i) a normalized Elmendorf MD Tear of at least 110, alternatively at least 111; (ii) a normalized Elmendorf CD Tear of at least 120, alternatively at least 121; (iii) a normalized 2% MD Secant Modulus of at least 104; (iv) a normalized 2% CD Secant Modulus of at least 110, alternatively at least 111; (v) a normalized Dart Impact of at least 105; (vi) a normalized Gloss (45°) of at least 110, alternatively at least 120, alternatively at least 130, alternatively at least 135; (vii) a normalized Optical Haze of at most 90, alternatively at most 80, alternatively at most 75; (viii) a normalized Clarity of at least 110, alternatively at least 115; (ix) at least two of (i) to (viii); and (x) each of (i) to (viii). The foregoing unpredictable improvements are exemplified in Table 3 later.

All other things being equal, the inventive activated spray-dried Ziegler-Natta catalyst system (inventive catalyst system) may be used in the inventive polymerization method to make a polyethylene composition such as an ethylene/alpha-olefin copolymer composition unpredictably having a higher fluidized bulk density and/or higher settled bulk density than a comparative composition made with a comparative activated spray-dried Ziegler-Natta catalyst system that has been activated with an activator consisting of triethylaluminum (i.e., lacking diethylaluminum chloride). Higher fluidized bulk density (FBD) is beneficial to performance of the polymerization method in a fluidized-bed gas-phase polymerization (FB-GPP) reactor configured with distributor plate to suppress loss of fines from the fluidized bed, as a lesser amount of polymer particles may be entrained into and clog the distributor plate. Higher FBD also enables polymerization reactions to use higher resin bed weights, and thus give higher Space Time Yield (STY, or Fluidized Bulk Density per polymer residence time) and production rates. Higher settled bulk density (SBD) is beneficial to storage, transport, and use of the polyethylene composition because less volume is required therefor, and thus greater manufacturing throughput rates, such as in pelleting operations, may be achieved in a given dimensioned equipment such as an extruder or pelletizer.

Embodiments of the inventive polyethylene composition, such as the inventive ethylene/alpha-olefin copolymer composition, having a substantially uniform comonomer composition distribution, is especially beneficial in manufacturing films thereof with the films so produced are expected to have improved mechanical properties by virtue of the substantially uniform comonomer composition distribution.

Definitions.

Composition: a chemical composition. Arrangement, type and ratio of atoms in molecules and type and relative amounts of molecules in a substance or material.

Compound: a molecule or collection of molecules.

Concentrating: a method of slowly increasing the mass or molar amount of less volatile chemical constituent(s) per unit volume of a continuous mixture comprising more volatile and less volatile chemical constituent(s). The method gradually removes more of the more volatile chemical constituent(s) than the less volatile constituent(s) from the continuous mixture to give a concentrate having a higher mass or molar amount of the less volatile chemical constituent(s) per unit volume than did the continuous mixture. The concentrate may be a precipitated solid.

Comonomer composition distribution or CCD: a line plot of a change in weight percent (wt %) or mole percent (mol %) comonomer content of an ethylene/alpha-olefin copolymer composition on y-axis versus change in LogM (by GPC) of the ethylene/alpha-olefin copolymer composition on x-axis.

Comonomer composition distribution, substantially uniform: having a flat (uniform CCD) or gently upwardly or downwardly sloping line (substantially uniform CCD) in a plot of weight percent (wt %) or mole percent (mol %) comonomer content of an ethylene/alpha-olefin copolymer composition on y-axis versus change in LogM (by GPC) of the ethylene/alpha-olefin copolymer composition on x-axis. A completely flat line plot has slope or gradient, m, equal to 0 (m=0). A line that is going higher as it goes from left to right has a slope m>0. A line that is going lower as it goes from left to right has a slope m<0. The ethylene/alpha-olefin copolymer composition having the substantially uniform CCD is expected to have improved mechanical and/or optical properties than a comparative ethylene/alpha-olefin copolymer composition having a normal or conventional CCD.

Composition Distribution Breadth Index (CDBI). A CDBI value represents the weight percent of the ethylene/alpha-olefin copolymer molecules having a comonomer content within 50% of the median total molar comonomer content. A relatively high CDBI value indicates that most of the copolymer molecules have a comonomer content that is within 50% of the median comonomer content, which further indicates that the copolymer polymers are relatively uniform in comonomer content. The CDBI value of a linear polyethylene homopolymer, which does not contain a comonomer, is defined to be 100%. Methods for calculating CDBI values of copolymers are known in the art, such as in WO 93/03093. When a CDBI value for a first copolymer is higher than that of a second copolymer, the higher CDBI value indicates that the comonomer distribution of the first copolymer is more controlled or limited than the comonomer distribution of the second copolymer. A CDBI value of a copolymer is readily calculated by data obtained from techniques known in the art, such as, for example, TREF (temperature rising elution fractionation) as described, for example, in U.S. Pat. No. 5,008,204 or in Wild et al., J. Poly. Sci. Poly. Phys. Ed., vol. 20, p. 441 (1982).

Consisting essentially of, consist(s) essentially of, and the like. Partially-closed ended expressions that exclude anything that would affect the basic and novel characteristics of that which they describe, but otherwise allow anything else.

Consisting of and consists of. Closed ended expressions that exclude anything that is not specifically described by the limitation that it modifies. In some aspects any one, alternatively each expression "consisting essentially of" or "consists essentially of" may be replaced by the expression "consisting of" or "consists of", respectively.

(Co)polymerize: polymerize a monomer or copolymerize a monomer and at least one comonomer.

dWf/{d Log M (by GPC): GPC is gel permeation chromatography, dWf is change in weight fraction, dLogM is also referred to as dLog(MW) and is change in logarithm of molecular weight.

Dry. Anhydrous. A moisture content from 0 to less than 5 parts per million based on total parts by weight. Materials fed to the reactor(s) during a polymerization reaction are dry.

Effective amount: a quantity sufficient to achieve an intended and appreciable beneficial result.

Feeds. Quantities of reactants and/or reagents that are added or "fed" into a reactor. In continuous polymerization operation, each feed independently may be continuous or intermittent. The quantities or "feeds" may be measured, e.g., by metering, to control amounts and relative amounts of the various reactants and reagents in the reactor at any given time.

Film: claimed film properties are measured on 25 micrometers thick monolayer films.

Fumed silica, hydrophobic pre-treated: a reaction product of contacting an untreated fumed silica with a hydrophobing agent to react with surface hydroxyl groups on the untreated fumed silica, thereby modifying the surface chemistry of the fumed silica to give a hydrophobic pre-treated fumed silica. The hydrophobing agent may be silicon based.

Fumed silica, untreated: pyrogenic silica produced in a flame. Consists of amorphous silica powder made by fusing microscopic droplets into branched, chainlike, three-dimensional secondary particles, which agglomerate into tertiary particles. Not quartz.

Hydrophobing agent: an organic or organosilicon compound that forms a stable reaction product with surface hydroxyl groups of fumed silica.

Induced condensing agent (ICA): An inert liquid useful for cooling materials in gas phase polymerization reactor(s) (e.g., a fluidized bed reactor).

Inert: Generally, not (appreciably) reactive or not (appreciably) interfering therewith in the inventive polymerization reaction. The term "inert" as applied to the purge gas or ethylene feed means a molecular oxygen ($O_2$) content from 0 to less than 5 parts per million based on total parts by weight of the purge gas or ethylene feed.

LogM is also referred to as Log(MW) and is logarithm of molecular weight

Mesoporous: having an average pore diameter of from 2 to 50 nanometers (nm).

Microporous: having an average pore diameter of less than 2 nm.

Modifier: a composition that alters reactivity, stability, or both of a substance on which the composition acts.

Polyethylene: A macromolecule, or collection of macromolecules, composed of constitutional units wherein 50 to 100 mole percent (mol %), alternatively 70 to 100 mol %, alternatively 80 to 100 mol %, alternatively 90 to 100 mol %, alternatively 95 to 100 mol %, alternatively any one of the foregoing ranges wherein the upper endpoint is <100 mol %, of such constitutional units are derived from ethylene monomer; and, in aspects wherein there are less than 100 mol % ethylenic constitutional units, the remaining constitutional units are comonomeric units derived from at least one ($C_3$-$C_{20}$)alpha-olefin; or collection of such macromolecules.

(Pro)catalyst: a procatalyst, a catalyst, or a combination of procatalyst and catalyst.

Quartz: an untreated, nonporous crystalline form of silicon dioxide. Particulate or bulk.

Silica. A particulate form of silicon dioxide that may be amorphous. Crystalline, or gel-like. Includes fused quartz, fumed silica, silica gel, and silica aerogel.

Spray-drying: rapidly forming a particulate solid comprising less volatile chemical constituents via aspiration of a bulk mixture of the less volatile chemical constituents and more volatile chemical constituents through a nebulizer using a hot gas. The particle size and shape of the particulate solid formed by spray-drying may be different than those of a precipitated solid.

System: an interrelated arrangement of different chemical constituents so as to form a functioning whole.

Transport: movement from place to place. Includes from reactor to reactor, tank to reactor, reactor to tank, and manufacturing plant to storage facility and vice versa.

Ziegler-Natta (pro)catalysts and Ziegler-Natta (pro)catalyst systems. See Introduction for general descriptions. All of these forms generally fall into the heterogeneous class of Ziegler-Natta (pro)catalysts and systems because they constitute a solid phase in a gas- or liquid-phase olefin polymerization reaction.

Materials.

Activator. The activator may comprise a ($C_1$-$C_4$)alkyl-containing aluminum compound. The ($C_1$-$C_4$)alkyl-containing aluminium compound may independently contain 1, 2, or 3 ($C_1$-$C_4$)alkyl groups and 2, 1, or 0 groups each independently selected from chloride atom and ($C_1$-$C_4$)alkoxide. Each $C_1$-$C_4$)alkyl may independently be methyl; ethyl; propyl; 1-methylethyl; butyl; 1-methylpropyl; 2-methylpropyl; or 1,1-dimethylethyl. Each ($C_1$-$C_4$)alkoxide may independently be methoxide; ethoxide; propoxide; 1-methylethoxide; butoxide; 1-methylpropoxide; 2-methylpropoxide; or 1,1-dimethylethoxide. The ($C_1$-$C_4$)alkyl-containing aluminium compound may be triethylaluminum (TEA), triisobutylaluminum (TIBA), diethylaluminum chloride (DEAC), diethylaluminum ethoxide (DEAE), ethylaluminum dichloride (EADC), or a combination or mixture of any two or more thereof. The activator may be triethylaluminum (TEA), triisobutylaluminum (TIBA), diethylaluminum chloride (DEAC), diethylaluminum ethoxide (DEAE), or ethylaluminum dichloride (EADC).

($C_3$-$C_{20}$)alpha-olefin. A compound of formula (I): $H_2C$=$C(H)$—R (I), wherein R is a straight chain ($C_1$-$C_{18}$) alkyl group. ($C_1$-$C_{18}$)alkyl group is a monovalent unsubstituted saturated hydrocarbon having from 1 to 18 carbon atoms. Examples of R are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl. In some embodiments the ($C_3$-$C_{20}$)alpha-olefin is 1-propene, 1-butene, 1-hexene, or 1-octene; alternatively 1-butene, 1-hexene, or 1-octene; alternatively 1-butene or 1-hexene; alternatively 1-butene or 1-octene; alternatively 1-hexene or 1-octene; alternatively 1-butene; alternatively 1-hexene; alternatively 1-octene; alternatively a combination of any two of 1-butene, 1-hexene, and 1-octene.

Carrier material. Prior to treatment with the hydrophobing agent, the carrier material is untreated silica and has variable surface area and average particle size. In some embodiments, the surface area is from 50 to 150 square meter per gram ($m^2$/g). The average particle size may be less than 1 micrometer (μm). Each of the above properties are measured using conventional techniques known in the art. The untreated silica may be amorphous silica (not quartz), alternatively an amorphous silica, alternatively a fumed silica. Such silicas are commercially available from a number of sources. The silica may be in the form of spherical particles, which are obtained by a spray-drying process. The untreated silica may be calcined (i.e., dehydrated) or not calcined prior to treatment with the hydrophobing agent.

Ethylene: a compound of formula $H_2C$=$CH_2$.

Hydrophobing agent, silicon-based: an organosilicon compound that forms a stable reaction product with surface hydroxyl groups of a fumed silica. The organosilicon compound may be a polydiorganosiloxane compound or an organosilicon monomer, which contains silicon bonded leaving groups (e.g., Si-halogen, Si-acetoxy, Si-oximo (Si—ON=C<), Si-alkoxy, or Si-amino groups) that react with surface hydroxyl groups of untreated fumed silica to form Si—O—Si linkages with loss of water molecule as a by-product. The polydiorganosiloxane compound, such as a polydimethylsiloxane, contains backbone Si—O—Si groups wherein the oxygen atom can form a stable hydrogen bond to a surface hydroxyl group of fumed silica. The silicon-based hydrophobing agent may be trimethylsilyl chloride, dimethyldichlorosilane, a polydimethylsiloxane fluid, hexamethyldisilazane, an octyltrialkoxysilane (e.g., octyltrimethoxysilane), and a combination of any two or more thereof.

Induced condensing agent or ICA. In some aspects the ICA is a ($C_5$-$C_{20}$)alkane, alternatively a ($C_{11}$-$C_{20}$)alkane, alternatively a ($C_5$-$C_{10}$)alkane. In some aspects the ICA is a ($C_5$-$C_{10}$)alkane. In some aspects the ($C_5$-$C_{10}$)alkane is a pentane, e.g., normal-pentane or isopentane; a hexane; a heptane; an octane; a nonane; a decane; or a combination of any two or more thereof. In some aspects the ICA is isopentane (i.e., 2-methylbutane). The inventive method of polymerization, which uses the ICA, may be referred to herein as being an inert condensing mode operation (ICMO). Concentration in gas phase measured using gas chromatography by calibrating peak area percent to mole percent (mol %) with a gas mixture standard of known concentrations of ad rem gas phase components. Concentration may be from 1 to 10 mol %, alternatively from 3 to 8 mole %. The use of ICA is optional. In some aspects, including some of the inventive examples described later, an ICA is used. For example, in aspects of the method of making a mixture of ICA and catalyst may be fed into a polymerization reactor. In other aspects of the method, use of ICA may be omitted, and a mixed pre-formulated dry catalyst may be fed as such into the polymerization reactor, which lacks ICA.

Reducing agent. A material that is effective for chemically reducing a complex of $TiCl_3$ and $MgCl_2$ (Tired). The reducing agent may be used in a chemically reducing effective amount, which may be a quantity that is effective for forming the chemical reduction product but insufficient for activating the reduced complex of $TiCl_3$ and $MgCl_2$. The reducing agent may be a trialkylaluminum such as trihexylaluminum, a dialkylaluminum halide such as diethylaluminum chloride, or, typically, a combination of the trialkylaluminum and the dialkylaluminum halide such as a combination of trihexylaluminum and diethylaluminum chloride.

Spray-dried Ziegler-Natta (pro)catalyst systems, general. Although each form of the spray-dried Ziegler-Natta (pro) catalyst systems may have catalytic activity in olefin polymerization reactions, the activated form usually has much greater catalytic activity and polymer productivity than those of the respective procatalyst and reduced forms. All conditions being equal, the catalytic activity and polymer productivity of such reactions may vary from embodiment to embodiment of the activated spray-dried Ziegler-Natta catalyst system. Such variations are within the ordinary skill of an artisan to control and may depend upon the particular composition and construction of the activated spray-dried Ziegler-Natta catalyst system. The relevant composition factors include loadings of Ti and Mg and molar ratio of Mg to Ti ("mag-tie ratio"). The relevant construction factors include average primary particle size; primary particle size distribution; particle agglomeration; and particle or agglomerate shape of the Ziegler-Natta catalyst particles. The carrier material and catalyst system preparation method described above further define these construction factors.

The spray-dried Ziegler-Natta (pro)catalyst systems, general, independently may be in the form of a dry powder or a suspension or slurry in a saturated and/or aromatic hydrocarbon solvent. The saturated and/or aromatic hydrocarbon solvent may aid handling of the (pro)catalyst system. The saturated and/or aromatic hydrocarbon solvent may be an alkane or an alkyl-substituted benzene (toluene or xylenes).

The spray-dried Ziegler-Natta (pro)catalyst systems, general, independently may be made, prepared, reacted, reduced, activated, modified, handled, stored, and transported under conditions suitable for the particular purpose. Such conditions include reaction conditions, storage conditions and transportation conditions. Such conditions are generally well-known in the art. For example, the spray-dried Ziegler-Natta (pro)catalyst systems independently may be made, prepared, reacted, reduced, activated, modified, handled, stored, and transported under an inert atmosphere such as a gas composed of anhydrous $N_2$, He, and/or Ar; and/or in a saturated and/or aromatic hydrocarbon solvent such as those described herein. Such conditions may include well-known techniques for such systems such as Schlenk line techniques.

Polymerization Types.

The activated spray-dried Ziegler-Natta catalyst system may be used in gas phase or liquid phase olefin polymerization reactions to enhance the rate of polymerization of monomer and/or comonomer(s). Liquid phase reactions include slurry phase and solution phase. In some aspects the olefin polymerization reaction is conducted in gas phase, alternatively liquid phase, alternatively slurry phase, alternatively solution phase. Conditions for gas phase and liquid phase olefin polymerization reactions are generally well-known. For illustration, conditions for gas phase olefin polymerization reactions are described below.

Polymerization Reactors.

The polymerization may be conducted in a high pressure, liquid phase or gas phase polymerization reactor to yield the inventive polyethylene composition. Such reactors and methods are generally well-known in the art. For example, the liquid phase polymerization reactor/method may be solution phase or slurry phase such as described in U.S. Pat. No. 3,324,095. The gas phase polymerization reactor/method may employ stirred-bed gas-phase polymerization reactors (SB-GPP reactors) and fluidized-bed gas-phase polymerization reactors (FB-GPP reactors) and an induced condensing agent and be conducted in condensing mode polymerization such as described in U.S. Pat. Nos. 4,453,399; 4,588,790; 4,994,534; 5,352,749; 5,462,999; and 6,489,408. The gas phase polymerization reactor/method may be a fluidized bed reactor/method as described in U.S. Pat. Nos. 3,709,853; 4,003,712; 4,011,382; 4,302,566; 4,543,399; 4,882,400; 5,352,749; 5,541,270; EP-A-0 802 202; and Belgian Patent No. 839,380. These patents disclose gas phase polymerization processes wherein the polymerization medium is either mechanically agitated or fluidized by the continuous flow of the gaseous monomer and diluent. Other gas phase processes contemplated include series or multistage polymerization processes such as described in U.S. Pat. Nos. 5,627,242; 5,665,818; 5,677,375; EP-A-0 794 200; EP-B1-649 992; EP-A-0 802 202; and EP-B-634421.

In an illustrative embodiment the polymerization method uses a pilot scale fluidized bed gas phase polymerization reactor (Pilot Reactor) that comprises a reactor vessel containing a fluidized bed of a powder of ethylene/alpha-olefin copolymer, and a distributor plate disposed above a bottom head, and defining a bottom gas inlet, and having an expanded section, or cyclone system, at the top of the reactor vessel to decrease amount of resin fines that may escape from the fluidized bed. The expanded section defines a gas outlet. The Pilot Reactor further comprises a compressor blower of sufficient power to continuously cycle or loop gas around from out of the gas outlet in the expanded section in the top of the reactor vessel down to and into the bottom gas inlet of the Pilot Reactor and through the distributor plate and fluidized bed. The Pilot Reactor further comprises a cooling system to remove heat of polymerization and maintain the fluidized bed at a target temperature. Compositions of gases such as ethylene, alpha-olefin, hydrogen, and oxygen being fed into the Pilot Reactor are monitored by an in-line gas chromatograph in the cycle loop in order to maintain specific concentrations that define and enable control of polymer properties. In some embodiments the gases are cooled, resulting in their temperature dropping below their dew point, at which time the Pilot Reactor is in condensing mode operation (CMO) or induced condensing mode operation (ICMO). In CMO, liquids are present downstream of the cooler and in the bottom head below the distributor plate. The activated spray-dried Ziegler-Natta catalyst system may be fed as a slurry or dry powder into the Pilot Reactor from high pressure devices, wherein the slurry is fed via a syringe pump and the dry powder is fed via a metered disk. The catalyst system typically enters the fluidized bed in the lower ⅓ of its bed height. The Pilot Reactor further comprises a way of weighing the fluidized bed and isolation ports (Product Discharge System) for discharging the powder of ethylene/alpha-olefin copolymer from the reactor vessel in response to an increase of the fluidized bed weight as polymerization reaction proceeds.

Polymerization Conditions (Co)polymerizing conditions. Any result effective variable or combination of such variables, such as catalyst composition; amount of reactant; molar ratio of two reactants; absence of interfering materials (e.g., $H_2O$ and $O_2$); or a process parameter (e.g., feed rate or temperature), step, or sequence that is effective and useful for the inventive copolymerizing method in the polymerization reactor(s) to give the inventive polyethylene composition.

At least one, alternatively each of the (co)polymerizing conditions may be fixed (i.e., unchanged) during production of the inventive polyethylene composition. Such fixed (co)polymerizing conditions may be referred to herein as steady-state (co)polymerizing conditions. Steady-state (co)polymerizing conditions are useful for continuously making embodiments of the inventive polyethylene composition having same polymer properties.

Alternatively, at least one, alternatively two or more of the (co)polymerizing conditions may be varied within their defined operating parameters during production of the inventive polyethylene composition in order to transition from the production of a first embodiment of the inventive polyethylene composition having a first set of polymer properties to a non-inventive polyethylene composition or to a second embodiment of the inventive polyethylene composition having a second set of polymer properties, wherein the first and second sets of polymer properties are different and are each within the limitations described herein for the inventive polyethylene composition. For example, all other (co)polymerizing conditions being equal, a higher molar ratio of ($C_3$-$C_{20}$)alpha-olefin comonomer/ethylene feeds in the inventive method of copolymerizing produces a lower density of the resulting product inventive polyethylene composition. Transitioning from one set to another set of the (co)polymerizing conditions is permitted within the meaning of "(co)polymerizing conditions" as the operating parameters of both sets of (co)polymerizing conditions are within the ranges defined therefore herein. A beneficial consequence of the foregoing transitioning is that any described property value for the inventive polyethylene composition may be achieved by a person of ordinary skill in the art in view of the teachings herein.

The (co)polymerizing conditions for gas or liquid phase reactors/methods may further include one or more additives such as a chain transfer agent, a promoter, or a scavenging agent. The chain transfer agents are well known and may be alkyl metal such as diethyl zinc. Promoters are well known such as in U.S. Pat. No. 4,988,783 and may include chloroform, $CFCl_3$, trichloroethane, and difluorotetrachloroethane. Scavenging agents may be a trialkylaluminum. Slurry or gas phase polymerizations may be operated free of (not deliberately added) scavenging agents. The (co)polymerizing conditions for gas phase reactors/polymerizations may further include an amount (e.g., 0.5 to 200 ppm based on all feeds into reactor) static control agents and/or continuity additives such as aluminum stearate or polyethyleneimine. Static control agents may be added to the gas phase reactor to inhibit formation or buildup of static charge therein.

The (co)polymerizing conditions may further include using molecular hydrogen to control final properties of the polyethylene composition. Such use of $H_2$ is generally described in Polypropylene Handbook 76-78 (Hanser Publishers, 1996). All other things being equal, using hydrogen can increase the melt flow rate (MFR) or melt index (MI) thereof, wherein MFR or MI are influenced by the concentration of hydrogen. A molar ratio of hydrogen to total monomer ($H_2$/monomer), hydrogen to ethylene ($H_2/C_2$), or hydrogen to comonomer ($H_2$/α-olefin) may be from 0.0001 to 10, alternatively 0.0005 to 5, alternatively 0.001 to 3, alternatively 0.001 to 0.10.

The (co)polymerizing conditions may include a partial pressure of ethylene in the polymerization reactor(s) independently from 690 to 3450 kilopascals (kPa, 100 to 500 pounds per square inch absolute (psia), alternatively 1030 to 2070 kPa (150 to 300 psia), alternatively 1380 to 1720 kPa (200 to 250 psia), alternatively 1450 to 1590 kPa (210 to 230 psia), e.g., 1520 kPa (220 psia). 1.000 psia=6.8948 kPa.

In some aspects the gas-phase polymerization is conducted in a fluidized bed-gas phase polymerization (FB-GPP) reactor under relevant gas phase, fluidized bed polymerization conditions. Such conditions are any variable or combination of variables that may affect a polymerization reaction in the FB-GPP reactor or a composition or property of an ethylene/alpha-olefin copolymer product made thereby. The variables may include reactor design and size, catalyst composition and amount; reactant composition and amount; molar ratio of two different reactants; presence or absence of feed gases such as H2 and/or O2, molar ratio of feed gases versus reactants, absence or concentration of interfering materials (e.g., $H_2O$), absence or presence of an induced condensing agent (ICA), average polymer residence time (avgPRT) in the reactor, partial pressures of constituents, feed rates of monomers, reactor bed temperature (e.g., fluidized bed temperature), nature or sequence of process steps, time periods for transitioning between steps. In performing an inventive method, variables other than that/those being described or changed by the inventive method may be kept constant.

Comonomer/ethylene gas molar ratio Cx/C2 of comonomer and ethylene being fed into the FB-GPP reactor may be from 0.0001 to 0.1, alternatively from 0.0002 to 0.05, alternatively from 0.0004 to 0.02.

Ethylene partial pressure in the FB-GPP reactor. From 690 to 2070 kilopascals (kPa, i.e., from 100 to 300 psia (pounds per square inch absolute)); alternatively from 830 to 1655 kPa (120 to 240 psia), alternatively from 1300 to 1515 kPa (190 to 220 psia). Alternatively, the partial pressure of ethylene may be from 690 to 3450 kilopascals (kPa, 100 to 500 pounds per square inch absolute (psia)), alternatively 1030 to 2070 kPa (150 to 300 psia), alternatively 1380 to 1720 kPa (200 to 250 psia), alternatively 1450 to 1590 kPa (210 to 230 psia), e.g., 1520 kPa (220 psia). 1.000 psia=6.8948 kPa.

Hydrogen to ethylene (H2/C2) gas molar ratios in the FB-GPP reactor may be from 0.0001 to 0.25, alternatively from 0.0005 to 0.200, alternatively from 0.005 to 0.149, alternatively from 0.009 to 0.109, alternatively from 0.010 to 0.100.

Oxygen ($O_2$) concentration relative to ethylene ("$O_2/C_2$", volume parts $O_2$ per million volume parts ethylene (ppmv)) in the FB-GPP reactor. Typically, oxygen is not purposely introduced into the FB-GPP reactor. In some embodiments the FB-GPP reactor is substantially free or free of $O_2$, e.g., the $O_2/O_2$ is 0.0000 to 0.0001 ppmv, alternatively 0.0000 ppmv.

Reactor bed temperature in the FB-GPP reactor may be from 90° to 120° C., alternatively from 95° to 115° C., alternatively from 99° to 110° C., alternatively from 100.0° to 109° C., alternatively from 87.0° to 89° C.

Residence time, average for polymer (avgPRT). The number of minutes or hours on average the polymer product resides in the FB-GPP reactor. The avgPRT may be from 30 minutes to 10 hours, alternatively from 60 minutes to 5 hours, alternatively from 90 minutes to 4 hours, alternatively from 1.7 to 3.0 hours.

Gas Phase Reactor and Polymerization Method Start-Up or Restart

Start-up or restart of a recommissioned FB-GPP reactor (cold start) or restart of a transitioning FB-GPP reactor (warm start) includes a time period that is prior to reaching steady-state polymerization conditions of step (a). Start-up or restart may include the use of a polymer seedbed pre-loaded or loaded, respectively, into the fluidized bed reactor. The polymer seedbed may be composed of powder of a polyethylene such as a polyethylene homopolymer or the ethylene/alpha-olefin copolymer.

Start-up or restart of the FB-GPP reactor may also include gas atmosphere transitions comprising purging air or other unwanted gas(es) from the reactor with a dry (anhydrous) inert purge gas, followed by purging the dry inert purge gas from the FB-GPP reactor with dry ethylene gas. The dry inert purge gas may consist essentially of molecular nitrogen ($N_2$), argon, helium, or a mixture of any two or more thereof. When not in operation, prior to start-up (cold start), the FB-GPP reactor contains an atmosphere of air. The dry inert purge gas may be used to sweep the air from a recommissioned FB-GPP reactor during early stages of start-up to give a FB-GPP reactor having an atmosphere consisting of the dry inert purge gas. Prior to restart (e.g., after a change in seedbeds), a transitioning FB-GPP reactor may contain an atmosphere of unwanted ICA or other unwanted gas or vapor. The dry inert purge gas may be used to sweep the unwanted vapor or gas from the transitioning FB-GPP reactor during early stages of restart to give the FB-GPP reactor an atmosphere consisting of the dry inert purge gas. Any dry inert purge gas may itself be swept from the FB-GPP reactor with the dry ethylene gas. The dry ethylene gas may further contain molecular hydrogen gas such that the dry ethylene gas is fed into the fluidized bed reactor as a mixture thereof. Alternatively the dry molecular hydrogen gas may be introduced separately and after the atmosphere of the fluidized bed reactor has been transitioned to ethylene. The gas atmosphere transitions may be done prior to, during, or after heating the FB-GPP reactor to the reaction temperature of the polymerization conditions.

Start-up or restart of the FB-GPP reactor also includes introducing feeds of reactants and reagents thereinto. The reactants include the ethylene and the alpha-olefin. The reagents fed into the fluidized bed reactor include the molecular hydrogen gas and the induced condensing agent (ICA) and the activated spray-dried Ziegler-Natta catalyst system.

A compound includes all its isotopes and natural abundance and isotopically-enriched forms. The enriched forms may have medical or anti-counterfeiting uses.

In some aspects any compound, composition, formulation, mixture, or reaction product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that chemical elements required by the compound, composition, formulation, mixture, or reaction product (e.g., C and H required by a polyolefin or C, H, and O required by an alcohol) are not excluded.

Catalyst productivity: calculated as kilograms (co)polymer resin made per kilogram of catalyst used ("kg copolymer/kg catalyst" or, simply, "kg/kg"). The calculation of kilogram of catalyst used is based on amount of titanium in polymer as measured by X-ray Fluorescence Spectrometry ("Ti IXRF") or by Inductively Coupled Plasma Optical Emission Spectrometry ("Ti ICPES"). Catalyst productivity may be expressed as a range from kg/kg (determined by Ti IXRF) to kg/kg (determined by Ti ICPES).

Clarity Test Method: ASTM D1746-15, *Standard Test Method for Transparency of Plastic Sheeting*. Results expressed percent (%) transmittance.

Dart Impact Test Method: measured according to ASTM D1709-16a, *Standard Test Methods for Impact Resistance of Plastic Film by the Free-Falling Dart Test Method*, Method A. Method A employs a dart with a 38.10±0.13-mm (1.500±0.005-in.) diameter hemispherical head dropped from a height of 0.66±0.01 m (26.0±0.4 in.), This test method can be used for films whose impact resistances require masses of about 50 g or less to about 6 kg to fracture them. Results expressed in grams (g).

Density Test Method: measured according to ASTM D792-13, *Standard Test Methods for Density and Specific Gravity (Relative Density) of Plastics by Displacement*, Method B (for testing solid plastics in liquids other than water, e.g., in liquid 2-propanol). Report results in units of grams per cubic centimeter (g/cm$^3$).

Elmendorf Tear Test Method: measured according to ASTM D1922-09, *Standard Test Methods for Propagation Tear Resistance of Plastic Film and Thin Sheeting by Pendulum Method*, Type B (constant radius). (Technically equivalent to ISO 6383-2.) Report results as normalized tear in cross direction (CD) or machine direction (MD) in gram-force (gf).

Film Puncture Test Method: ASTM D5748-95(2012), *Standard Test Method for Protrusion Puncture Resistance of Stretch Wrap Film*. Determines the resistance to puncture of a film as resistance to penetration of the film by a probe impinging the film at a standard speed such as 250 millimeters per minute (mm/min.). The probe is coated with a polytetrafluoroethylene and has an outer diameter of 1.905 cm (0.75 inch). The film is clamped during the test. The probe eventually penetrates or breaks the clamped film. The peak force at break, i.e., the maximum force, energy (work) to break or penetrate the clamped film, and the distance that the probe has penetrated at break, are recorded using mechanical testing software. The probe imparts a biaxial stress to the clamped film that is representative of the type of stress encountered by films in many product end-use applications. This resistance is a measure of the energy-absorbing ability of a film to resist puncture under these conditions. Results expressed in foot-pound force per cubic inch (ft*lbf/in$^3$).

Flow Index (190° C., 21.6 kg, "FI$_{21}$") Test Method: use ASTM D1238-13, *Standard Test Method for Melt Flow Rates of Thermoplastics by Extrusion Platometer*, using conditions of 190° C./21.6 kilograms (kg). Report results in units of grams eluted per 10 minutes (g/10 min.) or the equivalent in decigrams per 1.0 minute (dg/1 min.).

Flow Rate (190° C., 5.0 kilograms (kg), "I$_5$") Test Method: for ethylene-based (co)polymer is measured according to ASTM D1238-13, using conditions of 190° C./5.0 kg, formerly known as "Condition E" and also known as I$_5$. Report results in units of grams eluted per 10 minutes (g/10 min.) or the equivalent in decigrams per 1.0 minute (dg/1 min.).

Flow Rate Ratio (190° C., "I$_{21}$/I$_5$") Test Method: calculated by dividing the value from the Flow Index I$_{21}$ Test Method by the value from the Flow Rate I$_5$ Test Method. Unitless.

Fluidized Bulk Density (FBD) Test Method: defined as weight of solids per unit volume of a fluidized bed at a given superficial gas velocity (SGV). FBD (uncorrected)=(ΔP*S)/(S1*H), wherein ΔP is the pressure drop between bottom and middle taps in pounds per square inch (lb/in$^2$ or psi), S represents the cross-sectional area of the reactor in square inches (in$^2$), S1 represents the cross-sectional area of the reactor in square feed (ft$^2$), and H represents the distance between the bottom and middle taps in feet (ft). The FBD (uncorrected) is corrected to an actual value (FBD (corrected)) based on reactor pressure and temperature and gas density. The units of FBD (corrected) may be converted to kilograms per cubic meter (kg/m$^3$).

Gel permeation chromatography (GPC) Method: Weight-Average Molecular Weight Test Method: determine M$_w$, number average molecular weight (M$_n$), and M$_w$/M$_n$ using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 μm Mixed-B columns, all contained in an oven maintained at 160° C. Method uses a solvent composed of BHT-treated TCB at nominal flow rate of 1.0 milliliter per minute (mL/min.) and a nominal injection volume of 300 microliters (μL). Prepare the solvent by dissolving 6 grams of butylated hydroxytoluene (BHT, antioxidant) in 4 liters (L) of reagent grade 1,2,4-trichlorobenzene (TCB), and filtering the resulting solution through a 0.1 micrometer (μm) Teflon filter to give the solvent. Degas the solvent with an inline degasser before it enters the HTGPC instrument. Calibrate the columns with a series of monodispersed polystyrene (PS) standards. Separately, prepare known concentrations of test polymer dissolved in solvent by heating known amounts thereof in known volumes of solvent at 160° C. with continuous shaking for 2 hours to give solutions. (Measure all quantities gravimetrically.) Target solution concentrations, c, of test polymer of from 0.5 to 2.0 milligrams polymer per milliliter solution (mg/mL), with lower concentrations, c, being used for higher molecular weight polymers. Prior to running each sample, purge the DRI detector. Then increase flow rate in the apparatus to 1.0 mL/min/, and allow the DRI detector to stabilize for 8 hours before injecting the first sample. Calculate M$_w$ and M$_n$ using universal calibration relationships with the column calibrations. Calculate MW at each elution volume with following equation:

$$\log M_X = \frac{\log(K_X/K_{PS})}{a_X + 1} + \frac{a_{PS} + 1}{a_X + 1} \log M_{PS},$$

where subscript "X" stands for the test sample, subscript "PS" stands for PS standards, $a_{PS}$=0.67, $K_{PS}$=0.000175, and $a_X$ and $K_X$ are obtained from published literature. For polyethylenes, $a_X/K_X$=0.695/0.000579. For polypropylenes $a_X/K_X$=0.705/0.0002288. At each point in the resulting chromatogram, calculate concentration, c, from a baseline-subtracted DRI signal, $I_{DRI}$, using the following equation: c=$K_{DRI}I_{DRI}$/(dn/dc), wherein $K_{DRI}$ is a constant determined by calibrating the DRI,/indicates division, and dn/dc is the refractive index increment for the polymer. For polyethylene, dn/dc=0.109. Calculate mass recovery of polymer from the ratio of the integrated area of the chromatogram of concentration chromatography over elution volume and the injection mass which is equal to the pre-determined concentration multiplied by injection loop volume. Report all molecular weights in grams per mole (g/mol) unless otherwise noted. Further details regarding methods of determining Mw, Mn, MWD are described in US 2006/0173123 page 24-25, paragraphs [0334] to [0341]. Plot of dW/d Log(MW) on the y-axis versus Log(MW) on the x-axis to give a GPC chromatogram, wherein Log(MW) and dW/d Log(MW) are as defined above.

Melt Flow Ratio (190° C., "I$_{21}$/I$_2$") Test Method: calculated by dividing the value from the Flow Index I$_{21}$ Test Method by the value from the Melt Index I$_2$ Test Method. Unitless.

Melt Index (190° C., 2.16 kilograms (kg), "I$_2$") Test Method: for ethylene-based (co)polymer is measured according to ASTM D1238-13, using conditions of 190° C./2.16 kg, formerly known as "Condition E" and also known as I$_2$. Report results in units of grams eluted per 10 minutes (g/10 min.) or the equivalent in decigrams per 1.0 minute (dg/1 min.). 10.0 dg=1.00 g. Melt index is inversely proportional to the weight average molecular weight of the polyethylene, although the inverse proportionality is not linear. Thus, the higher the molecular weight, the lower the melt index.

Optical Gloss Test Method: ASTM D2457-13, *Standard Test Method for Specular Gloss of Plastic Films and Solid Plastics*. Measure specular gloss using a glassometer at incident angles 20°, 45°, 60°, or 75°. Specular gloss is unitless.

Optical Haze Test Method: ASTM D1003-13, *Standard Test Method for Haze and Luminous Transmittance of Transparent Plastics*. Measure haze using a hazemeter. Express haze as percentage of luminous transmission which in passing through the film deviates from an incident beam by forward scattering. Results expressed in percent (%).

1% or 2% Secant Modulus Test Method: measured according to ASTM D882-12, *Standard Test Methods for Tensile Properties of Thin Plastic Sheeting*. Used either 1% or 2% secant modulus in cross direction (CD) or machine direction (MD). Report results in megapascals (MPa). 1,000.0 pounds per square inch (psi)=6.8948 MPa.

Settled Bulk Density (SBD) Test Method: is defined as weight of material per unit volume. SBD is measured by pouring under gravity an amount of polymer resin to overflow a tared 400 cubic centimeter ($cm^3$) volume cylinder after excess of polymer resin is removed by sliding a straight edge across the top of the cylinder. The resulting level full cylinder is weighed, the tare weight of the cylinder is subtracted, and the resulting resin weight is divided by the cylinder volume to get SBD in pounds per $cm^3$, which value may be converted to pounds per cubic foot ($lb/ft^3$) or to kilograms per cubic meter ($kg/m^3$).

Tensile Modulus Test Method: measured according to ASTM D882-12, *Standard Test Methods for Tensile Properties of Thin Plastic Sheeting*. Report results in cross direction (CD) as average strain at yield in percent (%) or average stress at yield in megapascals (MPa), or in machine direction (MD) as average strain at yield in percent (%). 1,000.0 pounds per square inch (psi)=6.8948 MPa.

Diethylaluminum chloride: obtained from Albemarle Corporation.

Magnesium dichloride: a support material; obtained from SRC Worldwide Inc.

Magnesium metal chips (Grignard chips): Aldrich Chemical.

Hydrophobic fumed silica 1: a carrier material; a low surface area fumed silica that has been activated with dimethyldichlorosilane obtained as TS-610 from Cabot Corporation.

Tetrahydrofuran, anhydrous: an organic modifier; obtained from Pride Chemical Solution.

Titanium tetrachloride: obtained from WR Grace.

Titanium trichloride.AA: obtained from WR Grace.

Triethylaluminum: an activator; obtained from Albermarle or Akzo.

Trihexylaluminum: a reducing agent; obtained from Albermarle or Akzo. Also known is tri-n-hexylaluminum or TnHal.

1-butene ("C4"): comonomer; used at the molar ratio of C4/C2 in Tables 1 and 2.

Ethylene ("C2"): monomer; used at the partial pressure of C2 in Tables 1 and 2.

Isopentane: an induced condensing agent 1 ("ICA1"); used at the mole percent (mol %) concentration in the gas phase of a gas phase reactor relative to the total molar content of gas phase matter in Tables 1 and 2.

Molecular hydrogen gas ("H2"): used at a molar ratio of H2/C2 in Tables 1 and 2.

Preparation 1: synthesis of a modified spray-dried Ziegler-Natta procatalyst system modified by tetrahydrofuran. Add anhydrous tetrahydrofuran (28 kg) to a feed tank. Next add $TiCl_4$ (530 grams (g)) and Mg metal (36 g). Heat the resulting solution to 60° C., and mix it for 1 hour to firm a first solution. Then add finely-divided solid $MgCl_2$ (1340 g), and mix at 60° C. for 5 hours or overnight to dissolve the $MgCl_2$ and make a second solution. Once the $MgCl_2$ is dissolved, cool the second solution to 40° to 45° C. Then add hydrophobic pre-treated fumed silica (Cabosil TS-610, 1.7 kg) to give a suspension. Mix the suspension for 30 minutes to give a slurry of a modified Ziegler-Natta procatalyst system and hydrophobic pre-treated fumed silica. Spray the slurry in a spray dryer using the following conditions: inlet temperature 160° C., outlet temperature 110° C., feed rate approximately 45 kg per hour, total gas flow approximately 270 kg per hour, atomizer speed: varied typically approximately 85%, to give the modified spray-dried Ziegler-Natta procatalyst system of Preparation 1.

Preparation 1a (prophetic): synthesis of a modified spray-dried Ziegler-Natta procatalyst system modified by tetrahydrofuran. Add anhydrous tetrahydrofuran (28 kg) to a feed tank. Next add finely-divided solid $MgCl_2$ (1255 g). Heat mixture to 60° C., and mix it for 5 hours to overnight to form a third solution. Cool third solution to 40° C. to 45° C. Then add $TiCl_3$.AA (459 g), and mix for 1 hour. Then add hydrophobic pre-treated fumed silica (Cabosil TS-610, 1.6 kg) to give a suspension. Mix the suspension for 30 minutes to give a slurry of a modified Ziegler-Natta procatalyst system and hydrophobic pre-treated fumed silica. Spray the slurry in a spray dryer using the spray-drying conditions of Preparation 1 to give the modified spray-dried Ziegler-Natta procatalyst system of Preparation 1a Preparation 2 (actual) or 2a (prophetic): synthesis of a reduced spray-dried Ziegler-Natta catalyst system modified by tetrahydrofuran. Contact the modified spray-dried Ziegler-Natta procatalyst system made by a scaled-up version of Preparation 1 (actual) or is (prophetic) with a chemically reducing effective amount of a reagent mixture of 40 wt % trihexylaluminum (TnHAl) reducing agent in mineral oil in a 4 liter (L) volume mix tank for approximately 1 hour to give a reaction mixture, then add a reagent mixture of 12 wt % diethylaluminum chloride (DEAC) in mineral oil to the reaction mixture and mix for an additional 1 hour to give the reduced spray-dried Ziegler-Natta catalyst system of Preparation 2 or 2a, respectively. The molar ratio of TnHAl to DEAC is approximately 0.875/1.000.

Inventive Example 1 (IE1, actual) or 1a (IE1a, prophetic): synthesis of activated spray-dried Ziegler-Natta catalyst system modified by tetrahydrofuran. Contact the reduced spray-dried Ziegler-Natta catalyst system of Preparation 2 (actual) or 2a (prophetic) with the 25:75 (wt/wt) mixture of diethylaluminum chloride (DEAC) and triethylaluminum (TEAl or TEAL) activators in mineral oil are co-fed into the reactor by either co-feeding to the bed or by co-feeding into the cycle gas line to give the activated spray-dried Ziegler-Natta catalyst system of IE1 or 1a, respectively.

Inventive Example 2 (IE2, actual) and 2a (IE2a, prophetic): the same as IE1 or IE1a, respectively, except wherein the DEAC/TEAl weight/weight ratio is 60:40.

Comparative Example 1 (CE1): Replicate the procedure of IE1 except use an activator consisting of TEAl instead of the activator mixture, to give the activated spray-dried Ziegler-Natta catalyst system of CE1. The TEAl is fed into the reactor by either feeding to the bed or feeding into the cycle gas line.

Inventive Example A (IE(A)): copolymerization of ethylene and 1-butene catalyzed by the activated spray-dried Ziegler-Natta catalyst system to give an ethylene/1-butene copolymer composition. Preparation 2 is fed into the reactor as mineral oil slurry. Preparation 2 is fed into the reactor via a first feedline and a 25/75 weight/weight ratio of DEAC/TEAl mixture is fed into the polymerization reactor via a second feedline, wherein the first and second feedlines are different. Produced the ethylene/1-butene copolymer composition of IE(A) in a single gas phase polymerization reactor with a capacity of producing 15 to 25 kg resin per hour. For an experimental run, preloaded the reactor before startup with a seedbed of granular resin inside. Dried down the reactor with the seedbed below 5 ppm moisture with high purity nitrogen. Then introduced reaction constituent gases, ethylene, hydrogen, and 1-butene, to the reactor to build a desired gas phase composition as shown below in Table 1. At the same time heated the reactor up to the desired temperature. Once the (co)polymerizing conditions were reached, injected a feed of a slurry of 17 wt % of the reduced spray-dried Ziegler-Natta catalyst system (modified by tetrahydrofuran) of Preparation 2 in mineral oil into the reactor via a first feedline. Simultaneously, fed a 27/75 weight/weight ratio of DEAC/TEAl mixture into the polymerization reactor via a second feedline, wherein the first and second feedlines are different. Used about 5 to 10 bed turnovers to reach steady-state production of the ethylene/1-butene copolymer composition, thereby giving the embodiment of the inventive ethylene/1-butene copolymer composition of IE(A). Collected the inventive ethylene/1-butene copolymer composition from the reactor's product discharge outlet.

Inventive Example B (IE(B)): the same as IE(A) except Preparation 2 is fed into the reactor as mineral oil slurry. Preparation 2 is fed into the reactor via a first feedline and a 60/40 weight/weight ratio of DEAC/TEAl mixture is fed into the polymerization reactor via a second feedline, wherein the first and second feedlines are different.

Comparative Example A (CE(A)): copolymerization of ethylene and 1-butene catalyzed by the comparative activated spray-dried Ziegler-Natta catalyst system of CE1 to give an ethylene/1-butene copolymer composition. Replicate Inventive Example A except using TEAl as activator but not DEAC. Reactor and process conditions are listed later in Table 2. Collected the comparative ethylene/1-butene copolymer composition from the reactor's product discharge outlet.

The inventive ethylene/1-butene copolymer compositions of IE(A) and IE(B) and the comparative ethylene/1-butene copolymer composition of CE(A) may be characterized by MD-Stress @ Yield, CD-Stress @ Yield, Elmendorf MD Tear, Elmendorf CD Tear, 2% MD Secant Modulus, 2% CD Secant Modulus, Film Puncture, Dart Impact, Gloss (45°), Clarity, and optical haze using the aforementioned respective test methods. The comparative properties of the characterization of CE(A) may be normalized relative to same by reporting them as being equal to 100. The inventive properties of the characterizations of IE(A) and IE(B) may be independently normalized relative to the corresponding comparative properties of the characterization of CE(A) by dividing the inventive property values by the corresponding comparative property values, and multiplying the result by 100. For MD-Stress @ Yield, CD-Stress @ Yield, Elmendorf MD Tear, Elmendorf CD Tear, 2% MD Secant Modulus, 2% CD Secant Modulus, Film Puncture, Dart Impact, Gloss (45°), and Clarity, normalized values greater than 100 are an improvement versus 100. For optical haze, a normalized value of less than 100 is an improvement versus 100.

TABLE 1 gas phase copolymerization process/reactor conditions of IE(A) and IE(B).

| Reaction Constituent/Parameter | (co)polymerizing condition IE(A) and IE(B) |
|---|---|
| Reactor | Both single, continuous-mode, fluidized bed |
| Starting seedbed weight | Both 55 to 60 kg |
| Starting seedbed composition = granular HDPE resin | Both preloaded in reactor |
| Reactor Purging method | Both anhydrous $N_2$ gas |
| Reaction pressure | 2400 kPa and 2410 kPa |
| Ethylene ("C2") partial pressure | 689 kPa and 690 kPa |
| Comonomer = 1-butene; molar ratio C4/C2 | 0.389 and 0.406 |
| Molecular hydrogen gas ("H2") molar ratio H2/C2 | 0.174 and 0.187 |

TABLE 1-continued gas phase copolymerization process/reactor conditions of IE(A) and IE(B).

| Reaction Constituent/Parameter | (co)polymerizing condition IE(A) and IE(B) |
|---|---|
| Induced condensing agent 1: isopentane | Both 4 mol % |
| Operating reactor bed temperature | Both 88.0° C. |
| Superficial gas velocity (SGV, meters/second) | Both 0.55 m/s |
| Activated spray-dried Ziegler-Natta catalyst system IE2a, DEAC/TEAl (wt/wt) | 25:75 and 60:40 |
| Ti loading in catalyst system | Both 2.27 wt % |
| Al/Ti molar ratio | 33.7 and 35.0 |
| Catalyst Productivity (kg copolymer/kg catalyst) | 13,100 to 17,200 kg/kg and 12,200 to 15,800 kg/kg |
| Polymer product residence time | 2.85 hours and 3.07 hours |
| Polymer production rate (kg/hour) | 20 kg/hr and 19 kg/hr |
| Settled bulk density (kg/m$^3$) | 370 kg/m$^3$ and 380 kg/m$^3$ |
| Fluidized bulk density (kg/m$^3$) | 210/m$^3$ and 210 kg/m$^3$ |

TABLE 2 gas phase copolymerization process/reactor conditions of CE(A).

| Reaction Constituent/Parameter | (co)polymerizing condition |
|---|---|
| Reactor | single, continuous-mode, fluidized bed |
| Starting seedbed weight | 53 kg |
| Starting seedbed composition = granular HDPE resin | Preloaded in reactor |
| Reactor Purging method | Anhydrous $N_2$ gas |
| Reaction pressure | 2400 kPa |
| Ethylene ("C2") partial pressure | 690 kPa |
| Comonomer = 1-butene molar ratio C4/C2 | 0.417 |
| Molecular hydrogen gas ("H2") molar ratio of H2/C2 | 0.150 |
| Induced condensing agent 1: isopentane | 4 mol % |
| Operating reactor bed temperature | 88.0° C. |
| Superficial gas velocity (SGV, meters/second) | 0.55 m/s |
| Reduced spray-dried Ziegler-Natta catalyst system (activated with TEAl only) | CE1: Commercial UCAT™ J |
| Ti loading in catalyst system | 2.27 wt % |
| Al/Ti molar ratio | 42.6 |
| Catalyst Productivity (kg/kg) | 15,800 to 18,800 kg/kg |
| Polymer product residence time | 2.58 hours |
| Polymer production rate (kg/hour) | 21 kg/hr |
| Settled bulk density (kg/m$^3$) | 360 kg/m$^3$ |
| Fluidized bulk density (kg/m$^3$) | 199 kg/m$^3$ |

As shown by the data in Tables 1 and 2, the inventive activated spray-dried Ziegler-Natta catalyst systems of IE1 and IE2 produced ethylene/alpha-olefin copolymer compositions of IE(A) and IE(B), respectively, that unpredictably had higher fluidized bulk density and higher settled bulk densities than the corresponding bulk densities of the comparative ethylene/alpha-olefin copolymer composition of CE(A) that was produced with the comparative activated spray-dried Ziegler-Natta catalyst system of CE1.

TABLE 3 properties of ethylene/1-butene copolymer compositions of CE(A), IE(A), and IE(B).

| Polymer Property Measured | CE(A) Result | IE(A) Result | IE(B) Result |
|---|---|---|---|
| Density (ASTM D792-13), g/cm$^3$ | 0.9175 | 0.9197 | 0.9192 |
| Melt Index $I_2$ (190° C., 2.16 kg, ASTM D1238-04), g/10 min. | 2.03 | 1.98 | 1.84 |
| Flow Rate $I_5$ (190° C., 5.0 kg, ASTM D1238-04), g/10 min. | 5.81 | 5.61 | 5.24 |
| Flow Index $FI_{21}$ (190° C., 21.6 kg, ASTM D1238-04), g/10 min. | 54.0 | 51.0 | 47.8 |
| Melt Flow Ratio ($MI_{21}/M_2$) | 26.6 | 25.8 | 25.9 |
| Flow Rate Ratio ($MI_{21}/M_5$) | 9.29 | 9.10 | 9.11 |
| Number-average molecular weight ($M_n$), g/mol | 25,910 | 25,136 | 25,746 |
| Weight-average molecular weight ($M_w$), g/mol | 104,037 | 103,004 | 103,347 |
| Molecular mass dispersity ($M_w/M_n$), $Ð_M$ | 4.02 | 4.10 | 4.01 |

Figure 1:
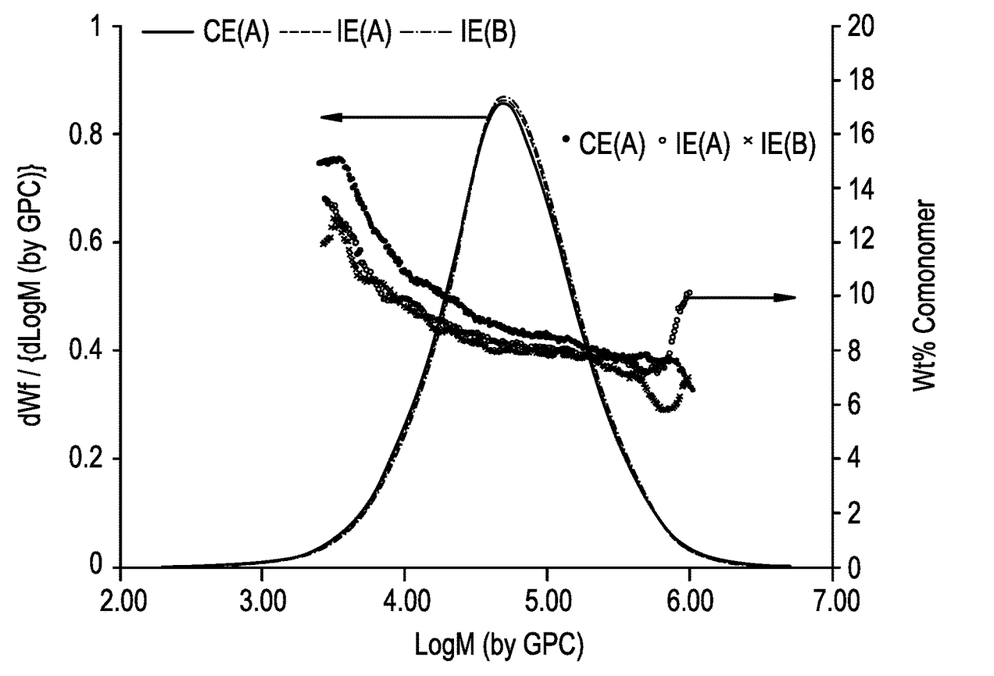
FIG. 1 contains line plots of changes in weight percent (wt %) comonomer content of ethylene/alpha-olefin copolymer compositions on y-axis versus changes in LogM (by GPC) of the ethylene/alpha-olefin copolymer compositions on x-axis for each of inventive examples (A) and (B) and comparative example (A).

As shown by the data in Table 3 or FIG. 1, the inventive ethylene/1-butene copolymer of IE(A), and by association the inventive activated spray-dried Ziegler-Natta catalyst system of IE1, showed significant improvements in comonomer composition distribution (CCD).

The invention claimed is:

1. An activated spray-dried Ziegler-Natta catalyst system comprising (A*) an activated Ziegler-Natta catalyst comprising an activated complex of TiCl$_3$ and MgCl$_2$, (B) a hydrophobic pre-treated fumed silica, and an effective amount of (C) an activator mixture of triethylaluminum (TEAl) and diethylaluminum chloride (DEAC); or an activation reaction product thereof; wherein the effective amount of (C) activator mixture is TEAl/DEAC at a weight/weight ratio of from 25:75 to 75:25.

2. A method of making the activated spray-dried Ziegler-Natta catalyst system of claim 1, the method comprising contacting a reduced spray-dried Ziegler-Natta catalyst system comprising (A$^{red}$) a reduced Ziegler-Natta catalyst comprising a chemical reduction product of chemically reducing a complex of TiCl$_3$ and MgCl$_2$ and (B) a hydrophobic pre-treated fumed silica, with the effective amount of (C) the activator mixture, thereby making the activated spray-dried Ziegler-Natta catalyst system.

3. A method of making a polyethylene composition, the method comprising contacting ethylene monomer and optionally zero, one, or more (C$_3$-C$_{20}$)alpha-olefin comonomers with the activated spray-dried Ziegler-Natta catalyst system of claim 1, to give a polyethylene composition comprising a polyethylene homopolymer or ethylene/(C$_3$-C$_{20}$)alpha-olefin copolymer, respectively, and the activated spray-dried Ziegler-Natta catalyst system, or a by-product thereof.

4. The method of claim 3 comprising a gas phase polymerization in the presence of molecular hydrogen gas (H$_2$) and, optionally, an induced condensing agent (ICA) in one, two or more gas phase polymerization reactors under (co)polymerizing conditions, thereby making the polyethylene composition; wherein the (co)polymerizing conditions comprise a reaction temperature from 80° to 110° C.; a molar ratio of the molecular hydrogen gas to the ethylene monomer from 0.001 to 0.050; and a molar ratio of the one or more (C$_3$-C$_{20}$)alpha-olefin comonomers to the ethylene monomer from 0.005 to 0.10.

5. The method of claim 3 comprising copolymerizing ethylene monomer and one or more (C$_3$-C$_{20}$)alpha-olefin comonomers to give the polyethylene composition comprising the ethylene/(C$_3$-C$_{20}$)alpha-olefin copolymer.

* * * * *